United States Patent
Schoene

(10) Patent No.: US 7,562,845 B2
(45) Date of Patent: Jul. 21, 2009

(54) RUDDER UNIT CONNECTION TO A FUSELAGE WITHOUT A BOLT-FAIRING STRUCTURE

(75) Inventor: Wolfram Schoene, Buxtehude (DE)

(73) Assignee: Airbus Deutschland GmbH (DE)

( * ) Notice: Subject to any disclaimer, the term of this patent is extended or adjusted under 35 U.S.C. 154(b) by 45 days.

(21) Appl. No.: 11/018,083

(22) Filed: Dec. 21, 2004

(65) Prior Publication Data

US 2005/0151018 A1 Jul. 14, 2005

Related U.S. Application Data

(60) Provisional application No. 60/606,555, filed on Sep. 2, 2004.

(30) Foreign Application Priority Data

Dec. 29, 2003 (DE) .................... 103 61 391

(51) Int. Cl.
*B64C 1/00* (2006.01)
*B64C 1/38* (2006.01)
*B64C 1/06* (2006.01)

(52) U.S. Cl. .................... 244/119; 244/129.1; 244/130; 244/131

(58) Field of Classification Search .......... 244/87, 244/119, 130, 131, 91, 125, 117 R, 118.1, 244/118.2, 120; 403/393, 408.1
See application file for complete search history.

(56) References Cited

U.S. PATENT DOCUMENTS

| 1,724,519 | A | * | 8/1929 | Schellewald | 403/393 |
| 2,378,885 | A | * | 6/1945 | Watter | 244/117 R |
| 2,603,437 | A | * | 7/1952 | Satre | 244/117 R |
| 2,689,698 | A | * | 9/1954 | Agnew | 244/123.8 |
| 3,499,622 | A | * | 3/1970 | Surcin et al. | 244/130 |

(Continued)

FOREIGN PATENT DOCUMENTS

DE 4404810 C2 2/1994

OTHER PUBLICATIONS

Niu, Michael C.Y.: "Airframe Structural Design," pp. 370-371 (XP002352144).

(Continued)

*Primary Examiner*—Michael R Mansen
*Assistant Examiner*—Joshua J Michener
(74) *Attorney, Agent, or Firm*—Lerner, David, Littenberg, Krumholz & Mentlik, LLP

(57) ABSTRACT

The connection of a rudder unit on the fuselage of an aircraft frequently leads to an inhomogeneous flow of forces in the connecting region between the rudder unit and the fuselage or even to an offset of the flow of forces relative to the centroidal axis, e.g., due to multiple-bolt connections. This is extremely disadvantageous with respect to static considerations. One embodiment of the present invention proposes a connection for a rudder unit on an aircraft fuselage, in which the flow of forces resulting from the connection between the rudder unit spars and the fuselage frames extends in a largely homogenous fashion from the rudder unit spars to the fuselage frames and into the fuselage. The connecting elements are advantageously arranged within the rudder unit and the fuselage in such a way that no additional enveloping aerodynamic fairings are required that would result in an additional increase in the aerodynamic drag.

14 Claims, 7 Drawing Sheets

U.S. PATENT DOCUMENTS 4,448,372 A    5/1984   Larson
5,673,892 A *  10/1997  Kjellman .................... 248/415
5,692,704 A *  12/1997  Buttgereit et al. ........... 244/119
6,314,630 B1 * 11/2001  Munk et al. .............. 29/407.01

OTHER PUBLICATIONS

"Flugrevue," Heft, Dec. 1970, pp. 28-29.

* cited by examiner

RUDDER UNIT CONNECTION TO A FUSELAGE WITHOUT A BOLT-FAIRING STRUCTURE

CROSS-REFERENCE TO RELATED APPLICATIONS

This application claims the benefit of the filing date of U.S. Provisional Patent Application No. 60/606,555 filed Sep. 2, 2004, the disclosure of which is hereby incorporated by reference.

BACKGROUND OF THE INVENTION

The invention relates to a rudder unit or vertical tail fin for aircraft. The present invention relates, in particular, to the connection for a rudder unit on the fuselage of an aircraft.

The outside contour of an aircraft results from the interrelationship between aerodynamic and mechanical or static requirements or ideal conceptions. In the ideal case, the contour of all external components is adapted to the ideal aerodynamic conditions. This results in the design options for the supporting structure, as well as the arrangement of the individual equipment components of the aircraft, being limited by the outside contour of the aircraft. In commercial aircraft, in which the rudder unit is directly connected to the tail, the tail section is subjected to higher-than-average mechanical loads, but still needs to fulfill particularly exacting aerodynamic requirements because the elevator and rudder units of the aircraft are accommodated at this location. On one hand, a certain outside contour of the rudder unit and the tail is required in order to realize a rudder unit that conforms to the aerodynamic requirements. On the other hand, all components required for the transmission of the corresponding forces and for ensuring the respective system functions of the elevator and rudder units need to be accommodated within an extremely confined space. Consequently, known solutions of aircraft tail sections and, in particular, the connection for the rudder unit on the tail section of the fuselage always constituted advantageous compromises between the requirements with respect to the laws of aerodynamics and the feasibility with respect to mechanical considerations.

Known connections for a rudder unit on the fuselage of an aircraft consist, for example, of multiple-bolt connections as they have been used so far on all Airbus aircraft. DE 44 04 810 C2 describes an aft fuselage of a commercial aircraft, in which the rudder unit is connected to the fuselage with the aid of the above-mentioned multiple-bolt connections. The rudder unit forces concentrated in the fittings described in this publication are introduced into the corresponding counter fittings on the corresponding fuselage frames and then distributed into the fuselage tail structure as planar as possible. In aircraft such as, for example, Airbus aircraft, three fittings arranged on the left side and three fittings arranged on the right side are bolted to the counter fittings on the fuselage side outside the streamline contour in order to create the widest base possible for the connection. The air current disturbed by these bolt connections is provided with an enveloping aerodynamic fairing [sic] that, however, results in an undesirable increase in the aerodynamic drag.

The multiple-bolt connections used so far for connecting the rudder units require a concentration of the flows of forces that is distributed over the spar cross sections in a planar fashion into a more or less line-shaped bolt structure that, in addition, is offset relative to the centroidal axis. The counter fittings of the bolt structure on the fuselage side then need to introduce this concentrated flow of forces into the fuselage tail structure as planar as possible.

The concentration of the forces from a large cross section, e.g., of the spars, to a smaller cross section, e.g., of the bolts or fittings, and the repeated reversal of the flow of forces on the fuselage side, as well as the additional moment resulting from the offset of the flow of forces relative to the centroidal axis between the spars that lie within the rudder unit contour and the bolts or fittings that lie outside this contour, may result in additional weight.

This construction results in relatively heavy bolts, fittings and connection structures. The aerodynamic fairing for these connection structures is situated in the region of the rudder unit base that is particularly critical with respect to fluidic considerations and results in additional weight and increased aerodynamic drag.

SUMMARY OF THE INVENTION

Based on these circumstances, there may be a need for a connection for a rudder unit on the fuselage of an aircraft with improved mechanical or aerodynamic properties.

In one exemplary embodiment of the connection for a rudder unit on the fuselage of an aircraft according to the present invention, the rudder unit contains rudder unit spars and the fuselage of the aircraft contains fuselage frames. In addition, the rudder unit is supported without connecting the rudder unit spars and the fuselage frames to one another by means of a bolt fairing structure. In this case, a flow of forces resulting from the connection between the rudder unit spars and the fuselage frames extends in a largely homogenous fashion from the rudder unit spars to the fuselage frames and into the fuselage.

The connection structure according to the invention consequently represents a connection for a rudder unit that may also contain a comparatively thin rudder unit profile on the aft fuselage of an aircraft, wherein the connection ensures a uniform, weight-saving flow of forces from the rudder unit spars into the fuselage while simultaneously eliminating the need for a bolt-fairing structure that generates additional drag.

According to another exemplary embodiment of the present invention, the rudder unit contains a rudder unit profile. In addition, the fuselage contains an aerodynamic groove with a groove profile. In this case, the groove profile of the fuselage corresponds to the rudder unit profile.

It is believed that this exemplary embodiment provides the advantage that an aerodynamically favorable outside contour of the connecting region for the rudder unit is achieved due to the corresponding profiles of the groove and the rudder unit. This may result in improved flying characteristics and fuel savings.

According to another exemplary advantageous embodiment of the present invention, the groove contains an upper taper that is situated at the connecting point between the fuselage structure and the rudder unit. In this case, the groove is realized in the same fashion as the part of the fuselage situated thereunder up to the upper taper. This means that no constructive changes to the fuselage structure are required in order to connect the rudder unit to the fuselage of the aircraft in accordance with this advantageous embodiment of the present invention.

According to another exemplary embodiment of the present invention, the rudder unit spars and the fuselage frames overlap one another in pairs and are connected to one another at the mutual overlaps. A stable and durable connection between the rudder unit spars and the fuselage frames that is characterized, in particular, by a uniform flow of forces from the rudder unit spars into the fuselage frames is ensured by realizing these mutual overlaps with a correspondingly large surface.

Other exemplary embodiments of the present invention are disclosed in the dependent claims and the following description.

BRIEF DESCRIPTION OF THE DRAWINGS

Embodiments of the invention are described in greater detail below with reference to the figures.

DETAILED DESCRIPTION

Figure 1:
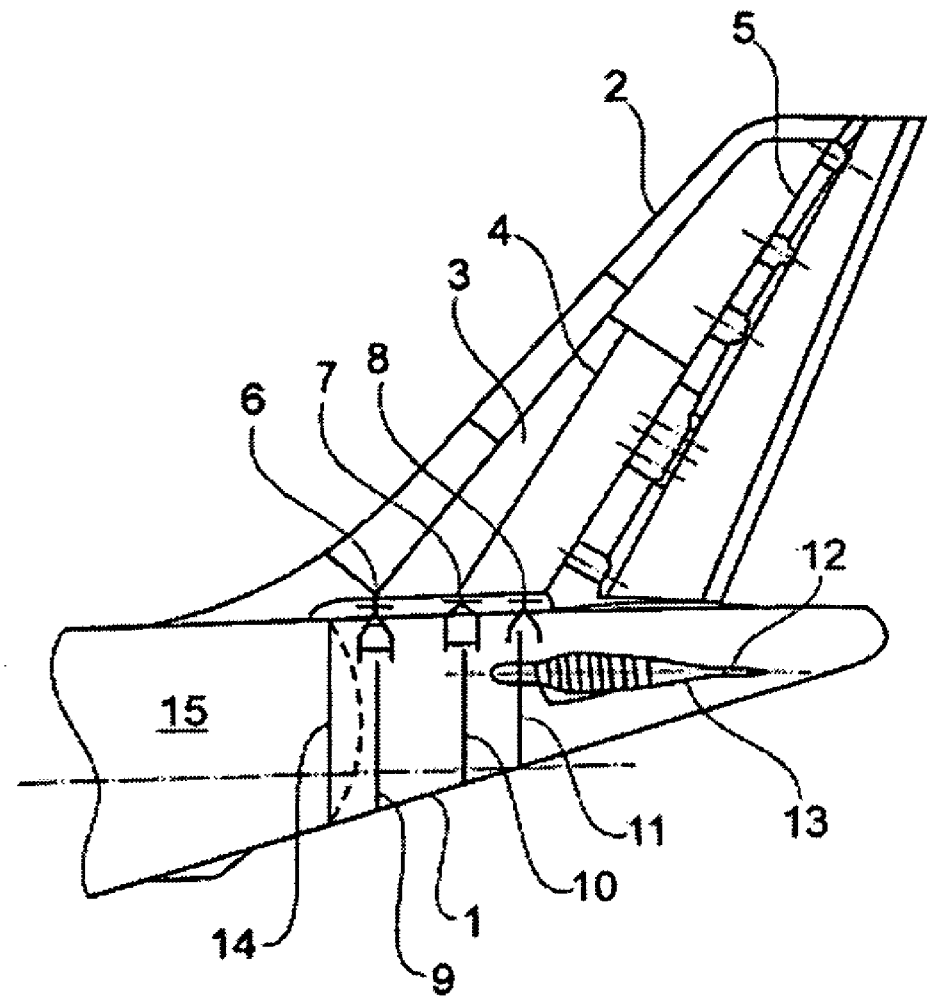
FIG. 1 shows a connection for a rudder unit according to the state of the art.

FIG. 1 shows the connection for a rudder unit or vertical tail fin on the region of the aft fuselage 1 of an aircraft. A rudder unit 2 comprising rudder unit spars 3, 4 and 5 is attached to the aft fuselage 1. The aft fuselage or fuselage 1 comprises, among the things, the fuselage frames 9, 10 and 11. The rudder unit spars 3, 4 and 5 of the rudder unit are connected to the fuselage frames 9, 10, 11 by means of the fittings 6, 7, 8. The outline 12 indicates the position of the elevator unit and the centerbox [unconfirmed translation] 13. In this case, the location, at which the fuselage 1 is penetrated by the centerbox 13, lies behind the last of the fuselage frames 9, 10, 11.

In this context, it should be noted that references such as "behind" or "in front of" always mean positioned closer toward the fuselage end or closer toward the fuselage nose.

The pressure frame 14 that seals the pressurized cabin 15 rearward is situated in front of the fuselage frame 9.

The fittings 6, 7, 8 shown in FIG. 1 serve for connecting the rudder unit spars 3, 4, 5 to the fuselage frames 9, 10, 11 and result in a concentration of the rudder unit forces at the locations of the fittings 6, 7, 8. The fittings 6, 7, 8 are bolted to fittings that are arranged on the fuselage side and not illustrated in FIG. 1 outside the streamline contour. In order to prevent these bolt connections from disturbing the air current, they are provided with an enveloping aerodynamic fairing. However, this leads to an undesirable increase in the aerodynamic drag.

Figure 2:
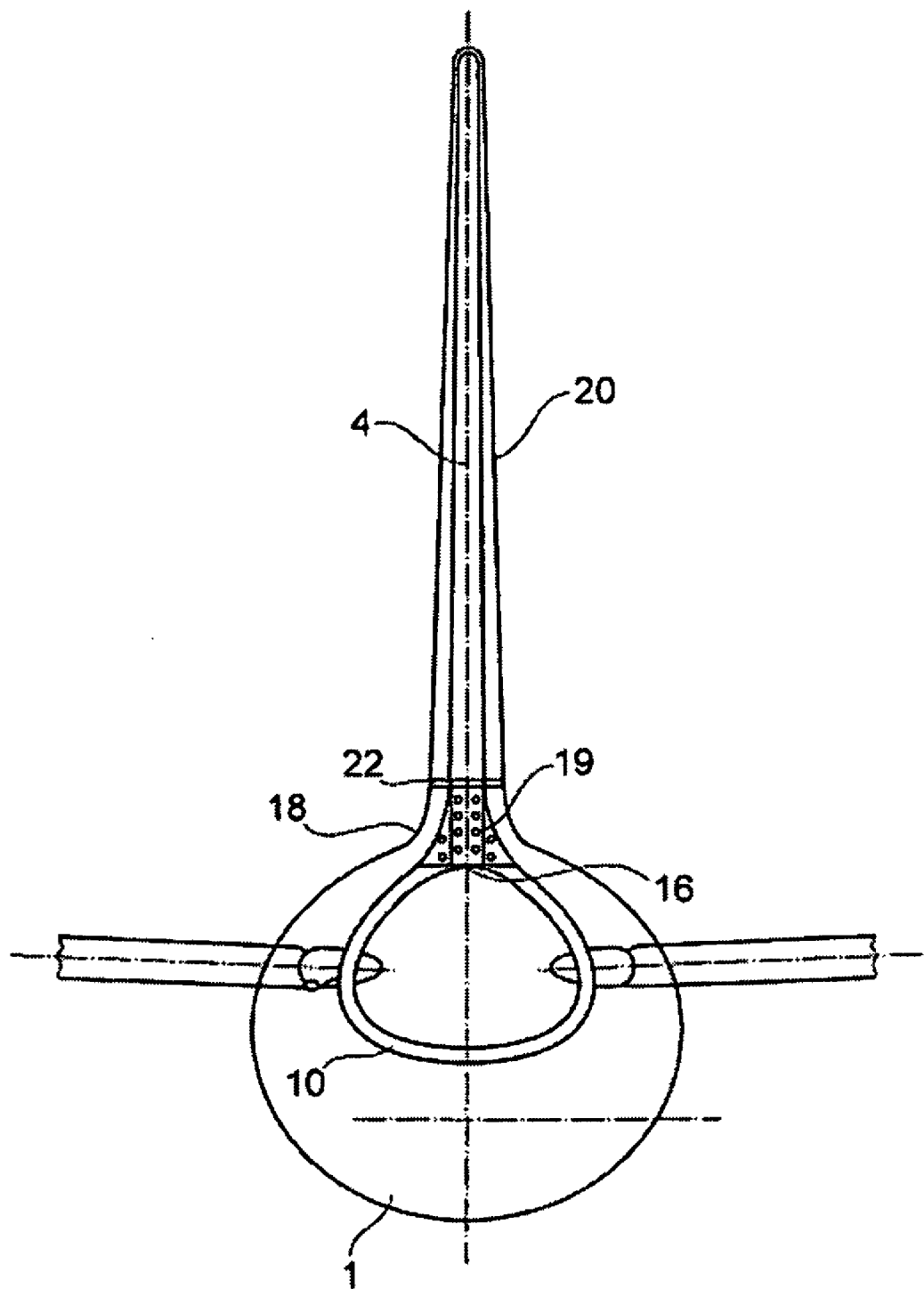
FIG. 2 shows a schematic cross-sectional representation of one embodiment of an aircraft tail section according to the present invention.

FIG. 2 shows a schematic cross-sectional representation of one exemplary embodiment of an aircraft tail section according to the present invention. The rudder unit connection structure according to the invention on the fuselage side consists of an aerodynamically optimized groove 18 that corresponds to the rudder unit profile and is designed in the same skin-stressed fashion with frames, stringers and a skin as the remaining aft fuselage up to its upper taper 22, at which the connecting point between the supporting fuselage structure and the rudder unit 20 is situated.

The rudder unit 20 contains a rudder unit profile and the fuselage or the aft fuselage 1 contains an aerodynamic groove 18 with a groove profile. The groove profile is adapted to the rudder unit profile. According to one embodiment of the present invention, the connecting frame 10 on the fuselage side (as well as the remaining fuselage frames 9 and 11 shown in FIGS. 3 and 4) contains a rearwardly directed break 16 on the upper edge of the local aft fuselage contour. This break corresponds to the connecting angle of the rudder unit spar 4 (and, according to FIGS. 3 and 4, the connecting angles of the rudder unit spars 3 and 5).

In new constructions, it would also be conceivable to utilize oblique frames that are installed into the fuselage in accordance with the connecting angle of the rudder unit spars such that a break 16 in the fuselage frames 9, 10, 11 is not required.

The rudder unit spars 3, 4, 5 protrude into the groove 18 on the fuselage side and can be connected to the fuselage frames 9, 10, 11 at this location either directly or with single or double-sided brackets of required cross-sectional surface, namely by means of separable or inseparable connecting elements. According to one embodiment of the present invention, the connecting elements 19 serve for producing screw connections, bracket connections or joint consolidations. Naturally, it would also be conceivable to realize a variation, in which the fuselage frames 9, 10, 11 protrude into the rudder unit 20 and are connected to the rudder unit spars 3, 4, 5 at this location.

This novel connection makes it possible to achieve a homogenous flow of forces from the rudder unit spars 3, 4, 5 into the fuselage structure without any aerodynamically disturbing external fittings and their fairings.

Figure 3:
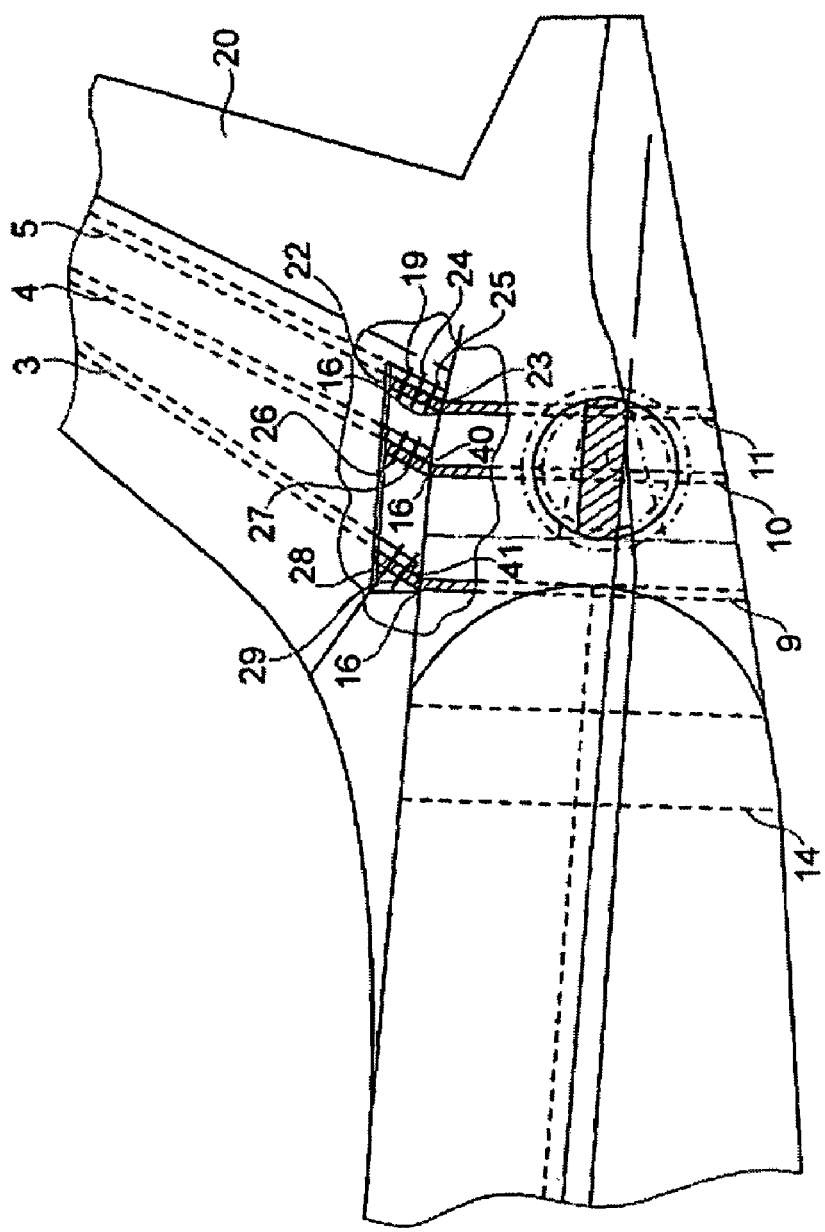
FIG. 3 shows a schematic side view of one exemplary embodiment of an aircraft tail section according to the present invention.

FIG. 3 shows a schematic side view of one exemplary embodiment of an aircraft tail section according to the present invention. These and other aircraft types have a predominantly cylindrical pressurized cabin that is sealed toward the rear by a pressure frame 14. The rudder unit spars 3, 4, 5 integrated into the rudder unit 20 overlap the fuselage frames 9, 10, 11 that are provided with breaks 16. Direct spar-frame connections 23, 40, 41 are produced at the mutual overlaps between the fuselage frames 9, 10, 11 and the rudder unit spars 3, 4, 5, namely underneath the taper 22.

The rudder unit spars 3, 4, 5 extend into the groove 18 (not visible in FIG. 3 due to the perspective) and are connected to the fuselage frames 9, 10, 11 at the mutual overlaps by means of separable connecting elements 19, 24, 25, 26, 27, 28, 29.

The mutual overlap between the spars and the frames and the associated large-surface connection between the rudder unit and the fuselage results in a flow of forces that altogether extends in a largely homogenous fashion. This homogenous flow of forces is achieved with the connection between the rudder unit spars 3, 4, 5 and the fuselage frames 9, 10, 11 and extends within the rudder unit profile. This essentially homogenous flow of forces from the rudder unit spars 3, 4, 5 into the fuselage structure reduces the weight because it does not contain multiple-bolt connections and is achieved without aerodynamically disturbing external fittings and their fairings. The additional moment occurring with known connections of this type is eliminated because the flow of forces within the rudder unit profile no longer needs to be transmitted into the fittings that lie outside this contour. The weight and the aerodynamic drag of the bolt-fairing structure at the base of the rudder unit are eliminated.

It should be noted that not all fuselage frames arranged in the tail of the aircraft fuselage 1 need be utilized for the connection of the rudder unit. It would also be conceivable to utilize only some of the rudder unit spars integrated into the rudder unit 20 for the connection of the rudder unit on the fuselage body 1.

Figure 4:
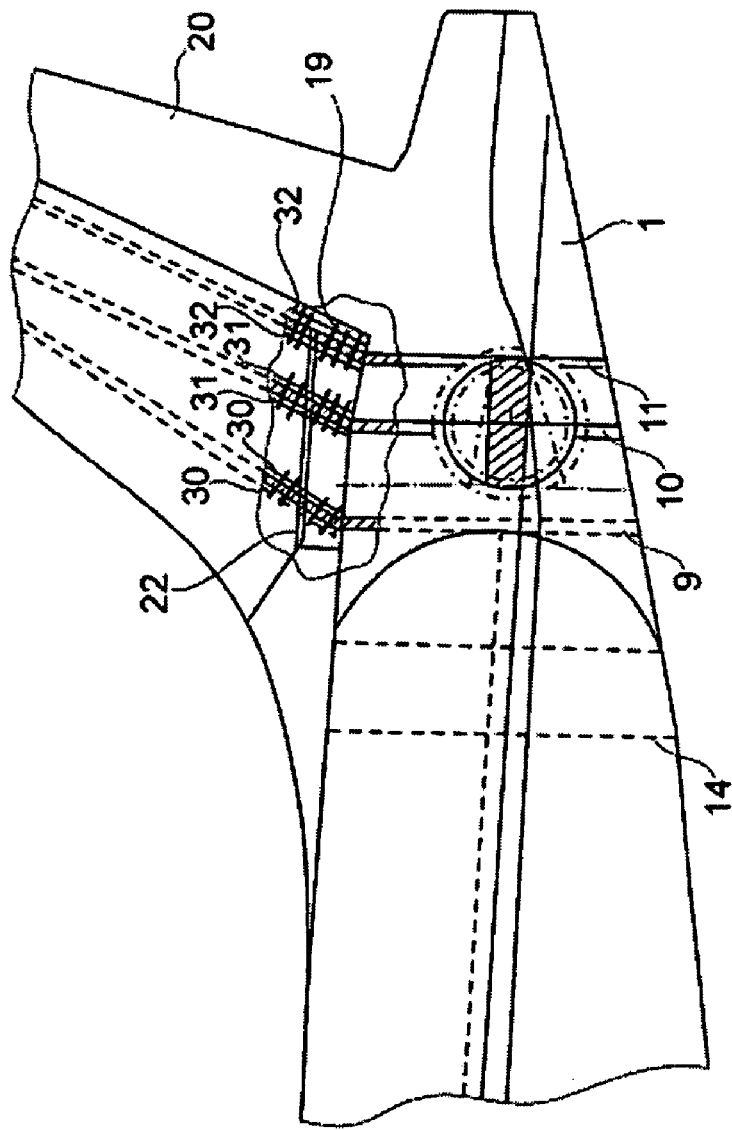
FIG. 4 shows a schematic side view of another exemplary embodiment of an aircraft tail section according to the present invention.

FIG. 4 shows a schematic side view of another exemplary embodiment of an aircraft tail section according to the present invention. In this case, the fuselage frames 9, 10, 11 arranged in the tail of the fuselage 1 are connected to the rudder unit spars 3, 4, 5 of the rudder unit 20 by means of double-sided brackets 30, 31, 32 in the region of the groove 18 (not visible in FIG. 4 due to the perspective), namely underneath the taper 22. The connections are realized with the aid of double-sided brackets 30, 31, 32, into which the regions of the fuselage frames 9, 10, 11 situated above the break 16 are inserted from the bottom and the rudder unit spars 3, 4, 5 are inserted from the top. In addition, separable or inseparable connecting elements 19, 24, 25, 26, 27, 28, 29 (see also FIG. 3) are provided in order to produce riveted, welded or screw connections.

The bracket connections between the rudder unit spars 3, 4, 5 and the fuselage frames 9, 10, 11 illustrated in FIG. 4 advantageously result in no offset of the flow of forces relative to the centroidal axis in the components that support the rudder unit 20. This can be explained in that the rudder unit spars 3, 4, 5 directly abut the fuselage frames 9, 10, 11 or are at least arranged directly above the fuselage frames 9, 10, 11 such that a largely homogenous flow of forces is achieved.

Figure 5:
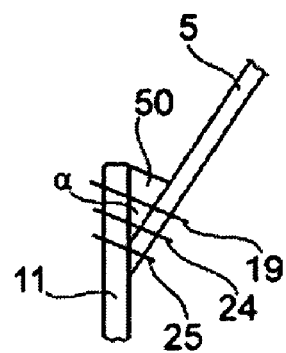
FIG. 5 shows a schematic representation of one embodiment of a connection for a rudder unit on the fuselage of an aircraft according to the present invention.

FIG. 5 shows a schematic representation of one embodiment of the connection for a rudder unit on the fuselage of an aircraft according to the present invention. In this case, the fuselage frame 11 includes an angle α with the rudder unit spar 5. A wedge-shaped connecting element 50 is inserted into the region defined between the fuselage frame 11 and the rudder unit spar 5. The rudder unit spar 5 abuts the fuselage frame 11. Connecting elements 24, 25, 19 are provided in order to rigidly connect the fuselage frame 11 and the rudder unit spar 5 in a supporting fashion, wherein said connecting elements serve for producing, for example, screw connections or riveted connections. This embodiment provides the advantage that a largely homogenous flow of forces is achieved between the rudder unit spar 5 and the fuselage frame 11 despite the fact that the fuselage frame 11 contains no break.

Figure 6:
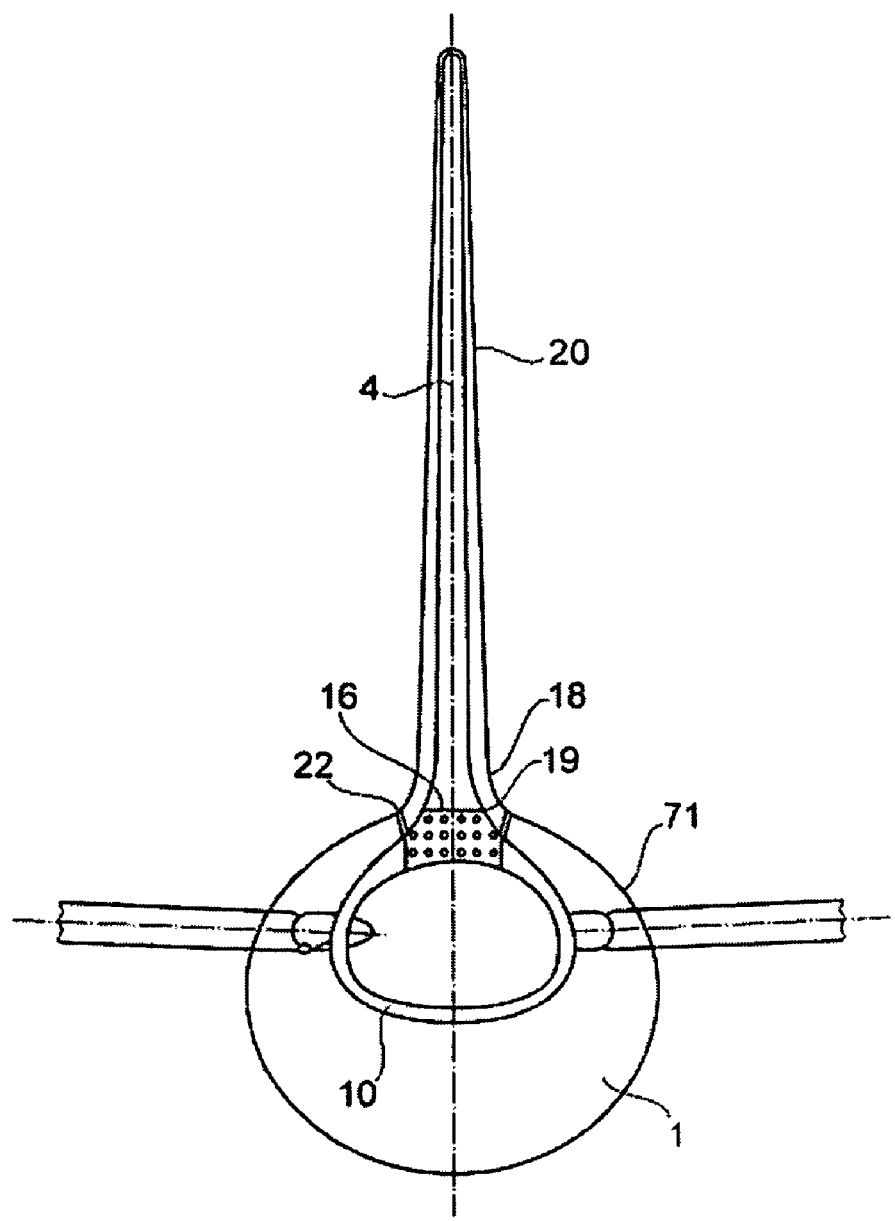
FIG. 6 shows a schematic cross-sectional representation of another exemplary embodiment of an aircraft tail section according to the present invention.

FIG. 6 shows a schematic cross-sectional representation of one exemplary embodiment of an aircraft tail section according to the present invention with a connection for a rudder unit on the aircraft fuselage. In this case, the groove 18 does not form an integral component of the fuselage as it is the case in the exemplary embodiments shown in FIGS. 2-5, but rather an integral component of the rudder unit 20 (SLW). The connecting point 22 between the SLW 20 and the fuselage 1 is situated at the lower end of the SLW groove 18 in this case such that the connecting point 22 projects the shape of the SLW profile on the lower groove end as well as on the corresponding aft fuselage planking cutout 71 in a top view.

In this embodiment, the SLW spars 4 protrude into the aft fuselage and are connected to the corresponding vertical or oblique frames 10 at this location by means of the separable connecting elements 19, namely either directly or by means of brackets. In the case of vertical frames 10, the frames contain a frame break 16 as described above with reference to FIG. 2.

Figure 7:
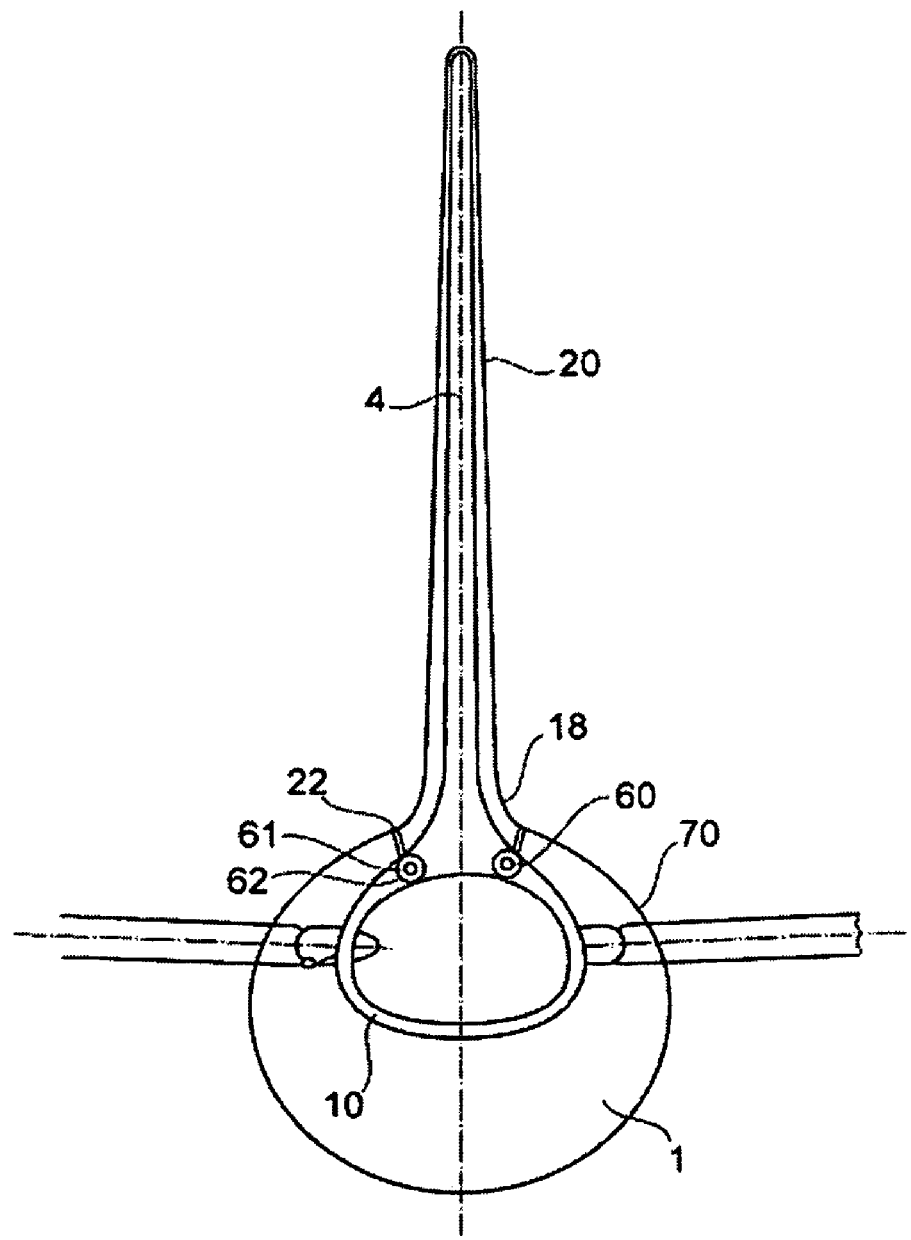
FIG. 7 shows a schematic cross-sectional representation of another exemplary embodiment of the aircraft tail section according to the present invention.

FIG. 7 shows a schematic cross-sectional representation of another exemplary embodiment of an aircraft tail section according to the present invention with a connection for a rudder unit on the aircraft fuselage 1. In this case, the SLW groove 18 forms an integral component of the SLW 20 analogous to FIG. 6, and the shape and position of the connecting point 22 between the SLW 20 and the fuselage planking 70 correspond to those of the fuselage planking 71 in the embodiment according to FIG. 6.

In contrast to FIG. 6, the SLW spars 4 shown in FIG. 7 are not connected to the fuselage frames 10 by means of brackets, but rather by means of a multiple-bolt connection consisting of covered connecting bolts without additional fairing 60, 61 and milled fitting or milled frame 62, however, without protruding from the fuselage and SLW streamline contours and without causing an offset in the centroidal axis between the fittings on the rudder unit side and on the fuselage side.

This means that a disadvantageous fairing for the connecting bolts outside the fuselage and SLW streamline contours is also eliminated in this embodiment of the invention.

The homogenous flow of forces between SLW spars and fuselage frames known from the state of the art consequently is also achieved in this case.

Figure 8:
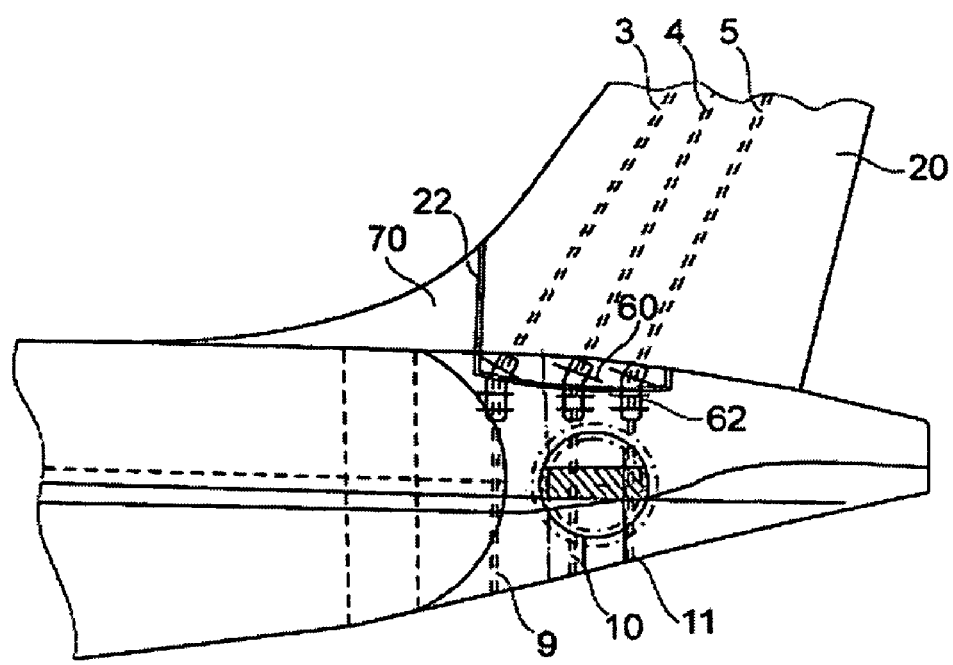
FIG. 8 shows a schematic side view of another exemplary embodiment of the aircraft tail section according to the present invention.

FIG. 8 shows a schematic side view of the exemplary embodiment of the aircraft tail section according to the invention that is illustrated in FIG. 7. This figure shows, in particular, the advantageous shape of the connecting point 22 between the SLW 20 and the fuselage planking 70. The SLW spars 3, 4, 5 are connected to the fuselage frames 9, 10, 11 by means of a multiple-bolt connection consisting of covered connecting bolts without additional fairing 60 and milled fitting or milled frame 62, however, without protruding from the fuselage and SLW streamline contours and without causing an offset in the centroidal axis between the fittings on the rudder unit side and on the fuselage side.

It should be noted that the term "comprising" does not exclude other elements or steps and the "a" or "an" does not exclude a plurality. Also elements described in association with different embodiments may be combined.

The invention claimed is:

1. A connection for a rudder unit on a fuselage of an aircraft, wherein the connection comprises:
    rudder unit spars, and
    fuselage frames;
    an aerodynamic groove;
    wherein the rudder unit spars are part of the rudder unit;
    wherein the fuselage frames are part of the fuselage;
    wherein the rudder unit is supported by connecting the rudder unit spars and the fuselage frames to one another without a bolt fairing structure;
    wherein a flow of forces resulting from the connection between the rudder unit spars and the fuselage frames extends in an essentially homogenous fashion from the rudder unit spars to the fuselage frames and into the fuselage;
    wherein the fuselage extends upwardly to form projections substantially along opposing sides of a base portion of the rudder unit such that the projections of the fuselage form the groove for the base portion of the rudder unit, the projections having an outer width corresponding with an outer width of the rudder unit;
    wherein the groove has an upper taper that is situated at a connecting point between the fuselage structure and the rudder unit
    wherein a fuselage skin comprises the aerodynamic groove which corresponds to a rudder unit profile and is skin-stressed with frames, stringers, and extends up to the upper taper of an aft fuselage section.

2. The connection of claim 1, further comprising:
a rudder unit profile; and
wherein the rudder unit profile is part of the rudder unit;
wherein the aerodynamic groove is part of the fuselage and has a groove profile; and
wherein the groove profile corresponds to the rudder unit profile.

3. The connection of claim 2,
wherein the groove is realized in the same fashion as the part of the fuselage situated thereunder up to the upper taper.

4. The connection of claim 1,
wherein the rudder unit spars and the fuselage frames overlap one another in pairs; and
wherein the rudder unit spars and the fuselage frames are connected to one another at mutual overlaps.

5. The connection of claim 1,
wherein the fuselage frames have an upper region and a lower region;
wherein the fuselage frames contain a rearwardly directed offset in their upper region, and
wherein the offset corresponds to a connecting angle of the rudder unit spars on the lower region of the fuselage frames such that the rudder unit spars and the fuselage frames extend essentially parallel above the offset.

6. The connection of claim 1,
wherein the fuselage frames and the rudder unit spars include an angle; and
wherein a region formed due to the angle between the fuselage frames and the rudder unit spars is at least partially filled out by a connecting element.

7. The connection of claim 1,
wherein the connection between the rudder unit spars and the fuselage frames is adapted as a clip; and
wherein a bracket connection is realized with a single or double-sided clip.

8. The connection of claim 1,
wherein the rudder unit spars protrude into a groove at a first location and are connected to the fuselage frames at the first location.

9. The connection of claim 8,
wherein the fuselage frames protrude into the rudder unit at a second location and are connected to the rudder unit spars at the second location.

10. The connection of claim 1,
wherein the flow of forces resulting from the connection between the rudder unit spars and the fuselage frames extends within a rudder unit profile.

11. The connection of claim 1,
wherein essentially no offset of the flow of forces relative to a centroidal axis occurs in the components that support the rudder unit.

12. The connection of claim 1,
wherein the connection between the rudder unit spars and the fuselage frames is separable.

13. The connection of claim 1,
wherein the aircraft is a commercial aircraft; and
wherein the commercial aircraft has a primarily cylindrical pressurized cabin.

14. An aircraft, comprising:
a connection for a rudder unit on a fuselage of the aircraft,
an aerodynamic groove;
wherein the rudder unit includes rudder unit spars;
wherein the fuselage includes fuselage frames;
wherein the rudder unit is supported by connecting the rudder unit spars and the fuselage frames to one another without a bolt-fairing structure; wherein a flow of forces resulting from the connection between the rudder unit spars and the fuselage frames extends in an essentially homogenous fashion from the rudder unit spars to the fuselage frames and into the fuselage,
wherein the fuselage extends upwardly to form projections substantially along opposing sides of a base portion of the rudder unit such that the projections of the fuselage form the groove for the base portion of the rudder unit, the projections having an outer width corresponding with an outer width of the rudder unit;
wherein the groove has an upper taper that is situated at a connecting point between the fuselage structure and the rudder unit
wherein a fuselage skin comprises the aerodynamic groove which corresponds to a rudder unit profile and is skin-stressed with frames, stringers, and extends up to the upper taper of an aft fuselage section.

* * * * *